Oct. 16, 1956   M. L. EDWARDS   2,766,730
CONDITION RESPONSIVE PNEUMATIC CONTROL SYSTEM
Filed Nov. 2, 1953
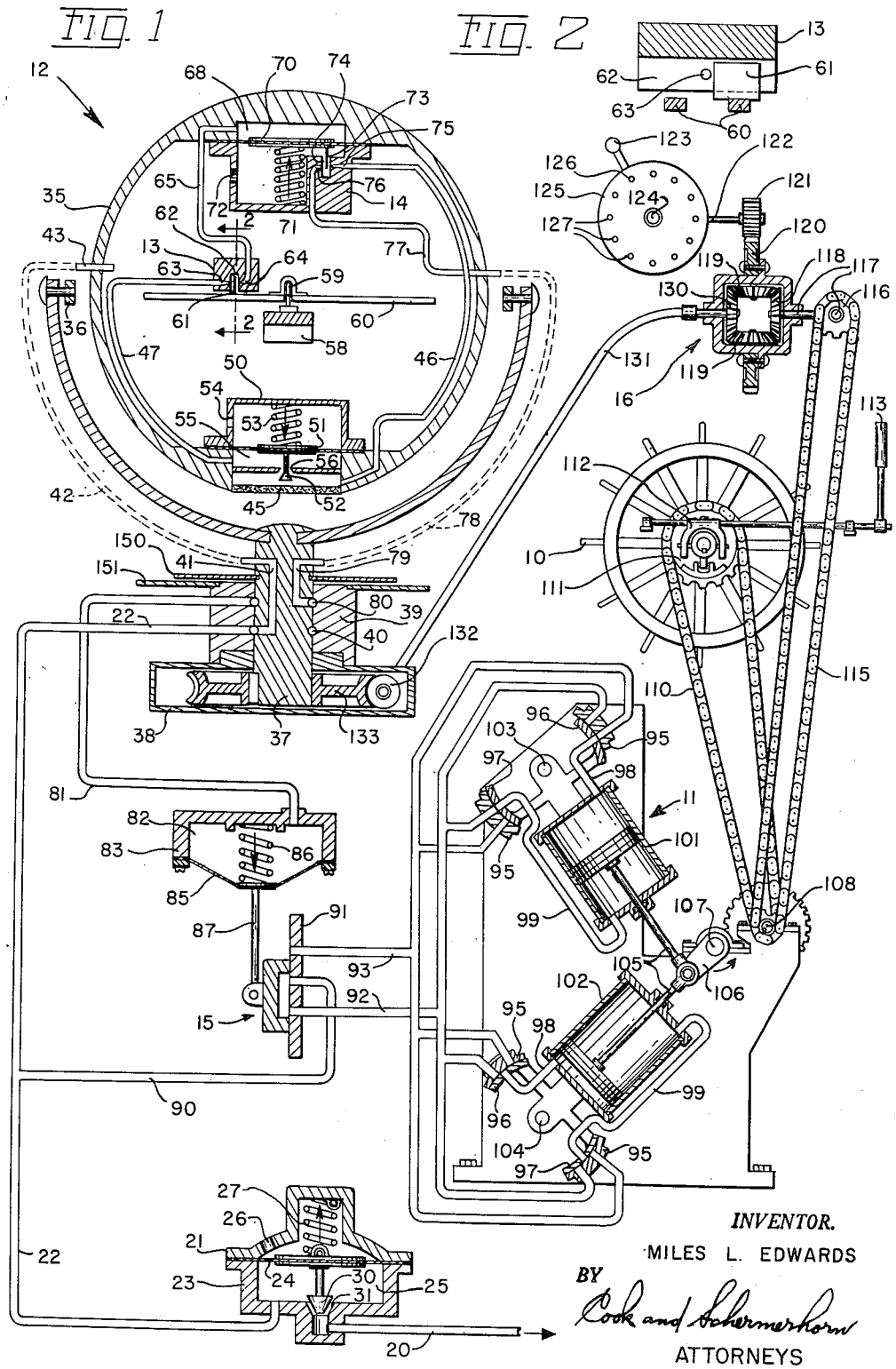
INVENTOR.
MILES L. EDWARDS
BY
Cook and Schermerhorn
ATTORNEYS

United States Patent Office 2,766,730
Patented Oct. 16, 1956

2,766,730

CONDITION RESPONSIVE PNEUMATIC CONTROL SYSTEM

Miles Lowell Edwards, Portland, Oreg.

Application November 2, 1953, Serial No. 389,590

12 Claims. (Cl. 121—39)

This invention relates to a pneumatic system to control the operation of a mechanical function in response to changes in a variable condition.

The system is of general application to various kinds of variable conditions such as direction, velocity, acceleration, pressure, temperature, and the like, and the device to be controlled in response thereto may comprise a rudder, valve, damper, or other instrumentality to influence the functioning of some particular apparatus. The present system is particularly adapted for operation by a controlled flow of air induced by some available source of reduced atmospheric pressure, such as the intake manifold of an internal combustion engine. The system is characterized by a movable sensing element which is substantially frictionless and has no resistance imposed on its movements by any control efforts which it may initiate. Incorporated in the control system is a novel pneumatic relay and amplifier for magnifying very small variations in air pressure produced by the sensing element into relatively large variations which are of sufficient magnitude to control a servo-motor device capable of exerting the necessary control efforts.

The foregoing characteristics have been utilized to advantage in an automatic pilot for a small boat where the sensing element is associated with a magnetic compass and the device to be controlled comprises a steering engine for the rudder of the boat. This practical embodiment of the invention as herein illustrated and described will enable persons skilled in the art to apply the principles of the invention to other mechanical functions of various types as hereinabove mentioned.

Objects of the invention are to provide a sensitive pneumatic control system having a sensing element substantially without friction and subject to no appreciable reaction forces in its sensing or control movements, to provide a sensing element of the type described which can be actuated by the feeble force of a magnetic compass, to provide a novel and improved pneumatic relay for amplifying the signals transmitted from the sensing element, to provide a pneumatic control system of the type described which will operate satisfactorily when connected to the intake manifold of a conventional internal combustion engine as a source of vacuum, and to provide an automatic pilot for a small boat which is relatively simple and inexpensive to manufacture and which is accurate, as well as rugged and reliable, in operation.

Additional objects and advantages will become apparent to persons skilled in the art as the details of the invention are described with reference to the specific embodiment illustrated in the accompanying drawings.

In the drawings:

Figure 1 is a general schematic view illustrating the principles of the invention embodied in an automatic pilot for a boat; and Figure 2 is an enlarged fragmentary view taken on the line 2—2 of Figure 1.

The numeral 10 designates the hand steering wheel of a boat, the boat being driven by a conventional internal combustion engine, not shown. The steering wheel 10 is connected in the usual manner with a conventional rudder. When the boat is under the control of the automatic pilot, the steering wheel 10 is turned in one direction or the other by a reversible pneumatic steering engine 11. The steering engine is controlled by a special form of magnetic compass 12 having a housing which incorporates certain elements of the present control system. These elements comprise the condition responsive or sensing element 13 and relay or amplifier 14. The relay 14 actuates a reversing valve 15 to change the direction of operation of the steering engine 11 to swing the rudder back and forth, as required, to hold the boat steady on a selected course. A compensating and follow-up mechanism 16 readjusts the compass position during each rudder movement to prevent over-correction of deviations from the course.

The numeral 20 designates a main vacuum line connected with the manifold of the engine or other suitable source of reduced pneumatic pressure. A suction regulating valve 21 maintains a constant pressure of four inches of mercury below atmospheric pressure in the vacuum line 22 regardless of fluctuations of the pressure of source 20. The valve 21 comprises a housing 23 having a flexible diaphragm 24 cooperating therewith to form a chamber 25. The upper side of diaphragm 24 communicates with atmospheric pressure through openings 26 and is connected with a tension spring 27 which pulls the diaphragm upwardly against atmospheric pressure. The underside of the diaphragm is connected with a valve member 30 which is adapted to seat in a valve opening 31 communicating with the main vacuum line 20. Vacuum line 22 is connected with chamber 25.

In the operation of the system, atmospheric air is admitted continuously into the compass housing and flows continuously through the pipe line 22, causing the pressure in chamber 25 to tend to rise above the desired four inches of mercury vacuum. Such pressure on the underside of the diaphragm raises the diphragm slightly, lifting the valve 30 and allowing the excess pressure to escape into the main vacuum line 20. Spring 27 is adjusted so that the valve 30 will close under the weight of atmospheric pressure when the pressure in chamber 25 falls below the desired four inches of mercury vacuum. The arrangement is such that the flow of air through pipe line 22 keeps the pressure in chamber 25 at a value which will hold the valve 30 lifted sufficiently to permit such air to escape around the valve in a steady flow at a rate which will maintain the desired constant pressure in chamber 25 and pipe 22.

The compass assembly 12 comprises a pneumatically sealed housing 35 mounted in a gimbal ring 36 on a rotatable spindle or pedestal 37, which is in turn mounted in a stationary supporting base or housing 38. The upper part of base 38 comprises a bearing 39 having an annular groove or channel 40 in communication with the vacuum line 22. A pipe or passageway 41 in the spindle 37 communicates at its lower end with the groove 40 and is connected at its upper end with a light, flexible hose 42, which in turn is connected with an outlet or suction port 43 in the compass housing 35.

Atmospheric air is admitted into the interior of housing 35 through an inlet screen 45 at two different pressures. A pipe 46 admits air at atmospheric pressure from a point immediately behind the screen 45, and a pipe 47 admits air through a reducing or regulating valve 50 at a pressure of 3.9 inches of mercury below atmospheric. Pressure regulating valve 50 comprises a diaphragm 51 connected with a valve member 52 and urged downwardly by a compression spring 53. The upper side of the diaphragm communicates through openings 54 with the pressure in the interior of housing 35 while the lower side of the diaphragm communicates with a chamber 55 with which the pipe 47 is connected. An inlet opening 56 provides communication between chamber 55 and atmosphere when the valve member 52 is unseated by the diaphragm 51.

The valve 50 is a pressure regulator which is sensitive to a 0.1 inch of mercury pressure differential to maintain the pressure in chamber 55 0.1 inch greater than the pressure in housing 35. The escape of air from chamber 55 through pipe 47 tends to reduce the pressure in chamber 55 allowing the pressure in housing 35 and spring 53 to open the valve member 52 slightly to admit atmospheric air into chamber 55 through inlet 56. Spring 53 is adjusted to hold the valve member 52 in a position to admit atmospheric air at a rate which will maintain the desired constant pressure differential relative to housing 35. It is important to note that the pressure control for chamber 55 is referenced to the pressure in the housing 35 and not atmospheric pressure. If the pressure in housing 35 should fluctuate for some reason the previously mentioned value of 3.9 will vary accordingly, but the differential of 0.1 will remain constant. Thus the maintenance of the specified constant pressure in housing 35 is desirable but not critical.

A support 58 in the housing 35 has an upstanding pivot point 59 for one or more magnetized compass needles 60. Mounted on the needles 60 at a distance from the pivot 59 is a thin vertical arcuate vane 61 extending in a direction perpendicular to the length of the needles and having a vertical knife edge adapted to move horizontally in a vertical slot 62 between the ends of a pair of aligned orifices 63 and 64. The sensing element, indicated generally at 13, preferably comprises a solid block of metal or other suitable material having the vertical slot 62 cut therein and the orifices 63 and 64 drilled therethrough. The orifices are preferably of tapered nozzle shape having an extremely small circular opening at each orifice end and spaced apart from each other only a sufficient distance to allow the vane 61 to pass therebetween without touching any part of the nozzle block. There is thus a slight clearance between the vane 61 and the opposite walls of slot 62, and the ends and bottom of slot 62 are open to communicate with the free space within housing 35 whereby the orifices 63 and 64 are never closed by the vane 61. Orifice 63 may be referred to as a discharge nozzle and orifice 64 as a receiving orifice. The axis of alignment of the orifices intersects pivot 59 whereby a jet from nozzle 63 is oriented in a radial direction relative to the pivot.

The reduced pressure of four inches of mercury vacuum within the housing 35 draws air through discharge nozzle 63 from the higher pressure source at 3.9 inches of mercury vacuum in chamber 55 in a fine jet at a pressure differential of 0.1 inch of mercury. When the compass needles 60 do not stand in a position to interpose the vane 61 between the aligned orifices 63 and 64, the jet from orifice 63 blows into orifice 64 and produces a pressure in a pipe 65 connected with the latter orifice which is slightly above the pressure in housing 35. When the compass needles 60 rotate the vane 61 to intercept the jet from orifice 63, the air in this jet strikes the vane and passes out of slot 61 into the atmosphere within housing 35, from whence it is removed in a steady flow through outlet opening 43. The radial direction of the jet from orifice 63, under such condition, is exactly perpendicular to all possible points of impact on the arcuate surface of vane 61 and exerts no reaction on the vane capable of producing a torque or moment about the pivot 59 which would tend to deflect the needles 60. When the vane 61 fully obstructs the path of the jet from orifice 63, the pressure in pipe 65 remains equal to the constant pressure of four inches of mercury vacuum existing generally in the housing 35. The vane is sufficiently thin at its edge that the passing air stream exerts no turning moment to deflect the compass needles when the edge cuts the stream.

Pipe 65 communicates with a closed chamber 68 above a flexible diaphragm 70. The diaphragm is biased in an upward direction by a compression spring 71, and its underside is exposed by way of opening 72 to the constant pressure existing in housing 35. Mounted on the underside of the diaphragm is a thin vane 73 movable in a slot 74 between a discharge nozzle orifice 75 and a receiving orifice 76. The construction and arrangement of these parts are similar to the corresponding elements in the sensing element 13, except that the vane 73 moves vertically instead of horizontally, and so it is the position of its lower edge which determines whether the jet between the two orifices will be intercepted by the vane.

The nozzle and vane assemblies in the sensing element 13 and relay element 14 are similar in arrangement but different in dimensions. Using the pressure values indicated, good results have been obtained using vanes 61 and 73 of metal .003 and .010 inch thick, respectively, moving in slots or gaps 62 and 74 .030 and .050 inch wide, respectively. In other words, the distance from the orifice of the discharge nozzle 63 to the receiving orifice 64 is .030 inch and the distance from discharge nozzle 75 to receiving orifice 76 is .050 inch. Nozzle 63 and orifice 64 are .012 inch in diameter and nozzle 75 and orifice 76 are .023 inch in diameter. All four nozzle and orifice passages taper away from the orifice ends to a considerably larger diameter.

A jet of air issues from the orifice of nozzle 75 at atmospheric pressure, since this orifice is supplied by pipe 46 communicating with atmosphere immediately behind the screen 45. Receiving orifice 76 is connected with a pipe 77 which makes external connection with a flexible hose 78. Hose 78 connects with a pipe or passageway 79 in the spindle 37, which in turn communicates with an annular groove or channel 80 in the bearing block 39. An external pipe 81 connects with the channel 80.

Pipe 81 connects with the diaphragm chamber 82 of a pneumatic servo-motor device 83 which controls the air valve 15. Diaphragm 85 is urged outwardly by an internal compression spring 86 which opposes the external atmospheric pressure. The motions of the diaphragm produced by changes in pressure in pipe 77 are transmitted to the valve 15 by a valve rod 87.

The source of power for the steering engine 11 comprises a branch vacuum line 90 connected with a port member 91, as shown. A pair of pipes 92 and 93 are also connected to the port member 91 on opposite sides of the port communicating with vacuum supply pipe 90 whereby the valve member 15 in its lower position shown connects supply pipe 90 with the pipe 92 and in an upper position would connect the supply pipe with the other pipe 93. In each case, the pipe 92 or 93 which is not connected with the vacuum supply pipe 90 is open to atmospheric pressure and serves as an inlet pipe.

The pipes 92 and 93 connect with stationary port plates 95 which have sliding engagement with the movable port plates 96 and 97 on a pair of oscillating cylinders 101 and 102. These cylinders, together with the port plates 96 and 97, are mounted for oscillation on pivots 103 and 104 and have piston rods 105 connected with a crank 106 on a shaft 107, the cylinders being arranged at a 90 degree angle so that both piston rods will not reach a dead center position at the same time.

Pipes 98 connect the port plates 96 with the adjacent ends of the cylinders, and pipes 99 connect the port plates 97 with the remote ends of the cylinders. As the pistons reciprocate in the cylinders, the rotation of crank 106 causes the cylinders to oscillate on their respective pivots 103 and 104, thereby oscillating the port plates 96 and 97 relative to the stationary port plates 95 to perform the necessary reciprocating engine valve functions, as will be readily understood by persons skilled in the art.

Shaft 107 is geared to a shaft 108 which is connected by a sprocket chain 110 with a sprocket wheel 111 adjacent the pilot's steering wheel 10. A clutch mechanism 112, manipulable by handle 113, provides for connecting and disconnecting the sprocket 111 and the pilot wheel 10 so that the steering engine 11 may be disconnected from the pilot wheel when manual steering is desired.

A second chain drive 115 connects the shaft 108 with a sprocket wheel 116 on a shaft 117 connected with a differential gear 118 in the compensating or follow-up mechanism 16. For convenience of illustration, the sprocket wheel 116 is turned into the plane of the view and the shaft 117 may be considered as a short, flexible shaft, but it is to be understood that the mechanical arrangement of such details will vary according to the equipment on which the system is installed. Gear 118 meshes with a pair of bevel gears 119 mounted within and carried by a ring gear 120. Ring gear 120 meshes with a gear 121 on a shaft 122 connected with a crank handle 123 which is pivotally mounted at 124 on a circular latch plate 125. Here again, the plate 125 has been turned into the plane of the view and so the shaft 122 may be considered as a short, flexible shaft having one end connected with crank handle 123 on the axis of its pivot 124. Crank 123 is equipped with a short pin 126 adapted to enter one of the holes 127 in the plate 125 to lock the handle in adjusted position. Crank 123 may be rotated by hand by withdrawing the pin 126 from the holes. Any other suitable locking means may be employed.

Another bevel gear 130 meshes with the bevel gears 119 and is connected with one end of a flexible shaft 131. The other end of shaft 131 is connected with a worm 132 in mesh with a worm wheel 133 keyed on the lower end of spindle 37 of the compass unit 12. Mounted on the spindle 37 is a compass card 150 and immediately therebeneath and projecting therebeyond is a stationary lubber line card 151 mounted on the bearing block 39. When the device is installed on a boat, the lubber line card 151 is adjusted to bring the lubber line into parallelism with the longitudinal axis of the boat and thereafter this card remains stationary.

When the crank 123 is locked in a fixed position, the ring gear 120 cannot turn, and so any rudder movements produced by the steering engine 11 are transmitted through the differential gears 118, 119 and 130 to rotate the compass spindle 37. In order to steer a different course, the relationship between the rudder and the compass may be changed by turning crank 123, whereby gear 130 and shaft 131 are rotated relative to bevel gear 118 by the movement of ring gear 120 and differential gears 119.

*Operation*

When the engine or other source of vacuum is operating, the suction regulating valve 21 maintains a uniform pressure in the vaccum line 22 of four inches of mercury below atmospheric. Air enters the compass housing 35 continuously through nozzles 63 and 75 and is withdrawn continuously through port 43 and pipe line 22 at a rate controlled by the suction regulating valve 21 which is just sufficient to maintain the desired pressure. Pipe 81 is a pressure communicating pipe and does not carry a flow of air except for the relatively small amount required to operate the diaphragm 85.

Assume, first, that the boat has deviated from the desired course in a direction to cause the vane 61 on the compass needles to intercept the jet from discharge nozzle 63 so that the jet cannot impinge upon receiving orifice 64 and increase the pressure in pipe 65 and diaphragm chamber 68 of the relay 14. The pressure in chamber 68 is then equal to the pressure within compass housing 35, which is insufficient to project the vane 73 into the path of the air jet from discharge nozzle 75. This jet will, therefore, impinge upon the receiving orifice 76, increasing the pressure in pipes 77 and 81 and diaphragm chamber 82 of the servo-motor 83 to flex the diaphragm 85 downwardly and move the valve 15 downwardly, as shown. Atmospheric pressure will then enter through pipe 93 to operate the steering engine 11 in counterclockwise rotation of shaft 107 to swing the rudder to a corrective position and bring the boat back on course. At the same time, the chain drive connection 115 acting through the compensating or follow-up differential mechanism 16, will rotate compass spindle 37 a certain amount in a direction counter to the deviation of the compass housing resulting from the deviation of the boat. Such compensating movement of housing 35 anticipates the cessation of the corrective effort and avoids overshooting in the corrective change of course. In this way, within a certain range of deviation, the corrective movement applied to the rudder will be roughly proportional to the deviation whereby repeated over-correction and hunting will be minimized.

When the boat has corrected the deviation just described, or when the boat deviates in the opposite direction, the vane 61 on the compass needles moves relatively out of the path of the air jet from discharge nozzle 63, allowing this jet to impinge upon receiving orifice 64, creating a pressure in pipe 65 and diaphragm chamber 68 to deflect the diagraphm 70 downward and bring the relay vane 73 into a position to intercept the air jet being discharged from nozzle 75. Under this condition the pressure in pipe 77, which is communicated to diaphragm chamber 82 of the servo-motor 83, is the same as that existing within the compass housing 35 which is four inches of mercury below atmospheric. This value of pressure causes the diaphragm 85 to retract upwardly, moving the valve 15 to its upper position to reverse the steering engine 11. At the same time, the chain drive 115 to the compensating or follow-up differential mechanism 16 turns the compass spindle 37 to adjust the orientation of the compass housing.

The amplitude of each rudder movement depends upon the length of time the steering engine continues to operate in one direction and this is governed by the duration of the particular right or left signal transmitted from sensing unit 13. As soon as the rudder starts to respond to a given signal two effects are produced which operate to terminate the signal. The turning of the compass housing relative to the boat by the follow-up mechanism will cancel the signal, and the turning of the compass housing by reason of the corrective turning of the boat will also cancel the signal. Thus, the signal for a small correction will be cancelled quickly, producing a small rudder movement, and a signal for a large correction will persist for a longer time, producing a larger rudder movement. The operation is the same regardless of the position of the rudder at the time the signal is given, except that when a signal is cancelled, when the boat is in a turning movement off course, the continued turning of the boat will immediately produce a new signal to readjust the rudder position.

The navigating course may be changed at any time merely by rotating the crank handle 123 to change the relationship between the rudder position and the compass housing position. The immediate effect of such change, assuming that the boat has previously been traveling on course, is to move the nozzle combination 63, 64 of the sensing device 13 rapidly in one direction or the other away from its theoretical equilibrium position in which the common axis of the nozzles 63, 64 is aligned with the operating edge of vane 62. This initiates the necessary signal to change the rudder position and alter the course of the boat. The ratio of gears 120, 121 is such that one turn of crank 123 turns the compass housing through an exact whole number of degrees in azimuth, such as two degrees.

In practice, it is not necessary nor desirable to maintain a condition of stable equilibrium with the edge of vane 62 only partially intercepting the jet from discharge nozzle 63. The system is designed to function satisfactorily while it is continuously in action, applying slight corrective movements to the rudder first in one direction, then the other, which movements are quick enough and small enough so that they do not produce appreciable deviations of the boat. With this mode of operation, the nozzle assembly 63, 64 continually oscillates through a slight amplitude relative to the working edge of vane 62, due to the follow-up movements communicated to the compass housing through the differential assembly from the steering engine. This mode of operation eliminates the necessity for obtaining such a fine adjustment and balance in the various parts of the mechanism that will hold the valve 15 in a central or neutral position to prevent operation of the steering engine in either direction. By eliminating the necessity for maintaining a static equilibrium in the mechanism, the manufacture and adjustment of the mechanism is greatly simplified and there is less likelihood of the system getting out of order in the course of time.

It is to be understood that the various dimensions and pressure values specified hereinabove are cited only by way of example and are not intended to limit the invention. When an internal combustion engine is utilized as the source of vacuum to operate the system, the manifold pressure varies quite widely under different operating conditions of the engine and so the pressure value of four inches of mercury below atmospheric was selected because at least this degree of vacuum is always attainable with conventional marine engines under normal cruising conditions. If a separate vacuum pump or other more constant source of vacuum is available, the system may be adjusted to operate under a higher vacuum, if desired. It will also be apparent to persons skilled in the art that pressure differentials above atmospheric may be employed to advantage where a suitable source of air pressure is available.

A magnetic compass is a delicate instrument capable of producing only a very slight controlling force. The amplifier unit 14 can be made relatively rugged and durable without sacrificing sensitivity whereby it provides a very simple, inexpensive and practical means responsive to the feeble compass signal for controlling a sufficient pressure differential to move the servo-motor diaphragm 85 with adequate force through a length of stroke appropriate for operating many conventional control devices such as slide valve 15. This advantageous mode of operation is attained by pneumatic means which do not exert any force reactions back on the primary sensing element which would disturb the compass. Important also is the fact that precision of control is not affected by variations of pressure in the main air line which energizes the system. These features and advantages enable the principles of the invention to be applied to numerous other types of control systems where similar problems exist and where a source of vacuum or pressure is available or may be supplied, the present disclosure being merely illustrative of one such application.

The present control system involves a new application of certain principles illustrated in my prior patent, No. 2,655,316, issued October 13, 1953.

Having now described my invention and in what manner the same may be used, what I claim as new and desire to protect by Letters Patent is:

1. A pneumatic control system comprising a first discharge nozzle and receiving orifice unit, a vane movable between said nozzle and orifice in response to a variable condition, means for establishing a predetermined pressure differential between said nozzle and orifice, a second discharge nozzle and receiving orifice unit, a second vane movable between said nozzle and orifice in response to variations in the pressure in said first orifice, means for establishing a pressure differential between said second nozzle and orifice greatly exceeding said first pressure differential, and a servo-motor device actuated by variations in pressure in said second orifice.

2. In a pneumatic control system, a closed housing, a first discharge nozzle and receiving orifice unit in said housing, a vane movable between said nozzle and orifice in response to variations in a variable condition, means for maintaining a predetermined air pressure below atmospheric in said housing, means for supplying air to said discharge nozzle at a pressure slightly above the pressure in said housing, a second discharge nozzle and receiving orifice unit in said housing, a second vane movable between said second nozzle and second orifice in response to variations in pressure in said first orifice, means for supplying air under atmospheric pressure to said second nozzle, and control means connected with said second orifice adapted to change said variable condition.

3. In a pneumatic control system, an enclosed housing, a first discharge nozzle and receiving orifice unit in said housing, a first vane movable between said nozzle and orifice in response to variations in a variable condition, means for maintaining a predetermined pressure in said housing below atmospheric, means for supplying said nozzle with air at a pressure slightly above the pressure in said housing, a second discharge nozzle and receiving orifice unit in said housing, a diaphragm chamber in said housing connected with said first orifice and having a diaphragm movable in response to variations in pressure in said first orifice, a vane on said diaphragm movable transversely between said second nozzle and orifice, means for supplying said second nozzle with air at atmospheric pressure, and a pipe connected with said second orifice for actuating a control device.

4. A pneumatic control system comprising a closed housing, an air suction line connected with said housing, a suction regulating valve in said suction line between a source of suction and said housing adapted to maintain a predetermined pressure below atmospheric in said housing, a pneumatic sensing unit in said housing having a member movable in response to variations in a variable condition, an air inlet in said housing communicating with atmosphere, a pressure regulating valve connected with said inlet and arranged to supply air to said sensing unit at a predetermined pressure differential above the pressure in said housing and below atmospheric pressure, a pneumatic relay and amplifier unit in said housing actuated by said sensing unit, means for supplying air under atmospheric pressure to said relay and amplifier unit, and a pipe connected with said relay and amplifier unit for actuating a control device.

5. A pneumatic control system comprising a closed housing, a pneumatic sensing unit in said housing having a member movable in response to variations in a variable condition, an air outlet pipe connected with said housing, a suction regulating valve in said outlet pipe between a source of suction and said housing to maintain a predetermined air pressure in said housing, an air inlet in said housing for supplying air to said sensing unit, a pressure regulating valve for maintaining the pressure of said air supplied to said sensing unit at a predetermined differential above the air pressure in said housing and below atmospheric pressure, a pneumatic relay amplifier in said housing actuated by said sensing unit, an air supply under atmospheric pressure for said amplifier, and a pipe connection extending from said relay amplifier for actuating a control device.

6. A pneumatic control system comprising a closed housing, an air suction line communicating with said housing, a suction regulating valve in said suction line arranged to maintain a predetermined pressure below atmospheric in said housing, a first discharge nozzle and receiving orifice unit in said housing, a vane movable between said nozzle and orifice in response to variations in a variable condition, an air chamber in said housing for supplying air to said nozzle, a diaphragm closing one side of said air chamber, said diaphragm being exposed on one side to the pressure in said chamber and on its opposite side to the pressure in said housing, an air inlet in said chamber communicating with atmosphere, a valve member in said inlet connected with said diaphragm and arranged to maintain the pressure in said chamber at a predetermined differential above the pressure in said housing, a pressure responsive diaphragm in said housing defining a second air chamber in said housing, said second diaphragm being exposed on one side to the pressure in said second chamber and exposed on its opposite side to the pressure in said housing, said chamber being connected with said orifice, a second discharge nozzle and receiving orifice unit in said housing, a vane on said second diaphragm movable between said second nozzle and second orifice in response to variations in pressure in said first orifice, means for supplying air under atmospheric pressure to said second nozzle, and a pipe connected with said second orifice for actuating a control means.

7. A compass comprising a closed housing, means for maintaining a predetermined constant air pressure below atmospheric in said housing, a magnetic compass needle in said housing, a pneumatic sensing element in said housing responsive to relative movements of said housing and compass needle, a pressure regulating valve in said housing supplying air to said sensing element at a small pressure differential above said housing pressure, a pneumatic relay amplifier in said housing responsive to said sensing element, means for supplying air under atmospheric pressure to said amplifier, and a pneumatic connection extending from said amplifier for controlling a rudder.

8. A compass comprising a closed housing mounted in gimbal rings, means for maintaining a predetermined constant air pressure below atmospheric in said housing, a magnetic compass needle pivotally mounted in said housing for relative rotation, a rotatable vertical spindle supporting said gimbal rings, a pneumatic sensing element in said housing responsive to relative movements of said housing and compass needle, a pressure regulating valve in said housing supplying air to said sensing element at a small pressure differential above said housing pressure, a pneumatic amplifier in said housing actuated by said sensing element, means for supplying air under atmospheric pressure to said amplifier, and pneumatic connections in said spindle for said sensing element and relay.

9. A compass comprising a closed housing, a compass needle mounted on a pivot in said housing for relative rotation, means for maintaining a predetermined pressure below atmospheric in said housing, a discharge nozzle and receiving orifice unit in said housing, a vane on said compass needle movable between said nozzle and orifice, a pressure regulating valve in said housing for supplying air to said nozzle at a pressure slightly above said predetermined pressure in said housing, a diaphragm chamber in said housing connected with said orifice and having a diaphragm movable in response to pressure variations in said orifice, one side of said diaphragm being exposed to the pressure in said diaphragm chamber and the other side of said diaphragm being exposed to said predetermined constant pressure in said housing, a second discharge nozzle and receiving orifice unit, a vane on said diaphragm movable between said second nozzle and orifice, means for supplying said second nozzle with air at atmospheric pressure, and an external connection on said housing communicating with said second orifice.

10. A pneumatic control system comprising a closed chamber, means for maintaining a constant air pressure in said chamber, a sensing unit in said chamber comprising a nozzle and a receiving orifice disposed in the path of an air jet from said nozzle and a vane actuated in response to a variable condition for movement intermediate said nozzle and orifice between intercepting and non-intercepting positions relative to said jet, means for delivering a steady flow of air to said nozzle at a predetermined constant pressure differential above said chamber pressure, a flexible diaphragm having one side subjected to a predetermined constant pressure and its opposite side subjected to the air pressure in said receiving orifice, a second nozzle and a receiving orifice disposed in the path of an air jet from said second nozzle, a vane actuated by said diaphragm for movement intermediate said nozzle and orifice between intercepting and non-intercepting positions relative to said jet, said second orifice being exposed to said predetermined constant pressure when said jet is intercepted by said vane, means for delivering a steady flow of air to said second nozzle under a larger pressure differential above said predetermined constant pressure than said first pressure differential, and a pipe connection extending from said second orifice for actuating a control device.

11. A pneumatic sensing and signal amplifying system comprising a sensing unit and an amplifying unit, and means for subjecting said sensing unit to a predetermined constant air pressure below atmospheric pressure; said sensing unit comprising a nozzle and a receiving orifice disposed in the path of an air jet from said nozzle and a vane actuated in response to a variable condition for movement intermediate said nozzle and orifice between intercepting and non-intercepting positions relative to said jet, and means for delivering a steady flow of air to said nozzle at a predetermined constant pressure differential above said first predetermined pressure and below atmospheric pressure; said amplifying unit comprising a flexible diaphragm having one side subjected to a predetermined constant air pressure below atmospheric and its opposite side subjected to the air pressure in said receiving orifice of said sensing unit, a second nozzle and a receiving orifice disposed in the path of an air jet from said nozzle, a vane actuated by said diaphragm for movement intermediate said nozzle and orifice between intercepting and non-intercepting positions relative to said jet, means for delivering a steady flow of air at atmospheric pressure to said second nozzle, and a pipe connection extending from said second orifice for actuating a control device.

12. A pneumatic control system comprising a closed housing, a suction pipe connecting said housing with a source of suction, a suction regulating valve in said pipe arranged and adjusted to close said pipe to said source of suction when the pressure in said housing falls below a predetermined value and to open said pipe to said source of suction when the pressure in said housing rises above said predetermined value, a sensitive pneumatic sensing unit in said housing responsive to changes in a variable condition, an air inlet in said housing, a pressure regulating valve in said inlet connected with said sensing unit and adjusted to supply air to said sensing unit at a small pressure differential above said predetermined value, a pneumatic amplifier unit in said housing actuated by said sensing unit, and means for supplying air under atmospheric pressure to said amplifier unit for actuating a control device.

References Cited in the file of this patent

UNITED STATES PATENTS

| | | |
|---|---|---|
| 528,356 | Beck | Oct. 30, 1894 |
| 1,592,081 | Colvin | July 13, 1926 |
| 2,065,702 | Hubbard | Dec. 29, 1936 |
| 2,092,032 | Sperry et al. | Sept. 7, 1937 |
| 2,104,627 | Von Manteuffel | Jan. 4, 1938 |
| 2,129,586 | Moller | Sept. 6, 1938 |
| 2,166,206 | Benson | July 18, 1939 |
| 2,226,191 | Alkan | Dec. 24, 1940 |
| 2,333,044 | Rosch | Oct. 26, 1943 |
| 2,447,779 | Taplin | Aug. 24, 1948 |
| 2,619,104 | Temple | Nov. 25, 1952 |
| 2,670,464 | Wuensch et al. | Feb. 23, 1954 |

FOREIGN PATENTS

| | | |
|---|---|---|
| 150,088 | Switzerland | Dec. 16, 1931 |